(12) United States Patent
Highgate et al.

(10) Patent No.: US 9,327,244 B2
(45) Date of Patent: May 3, 2016

(54) IONIC MEMBRANE PREPARATION

(75) Inventors: Donald James Highgate, Surrey (GB); Jennifer Morton, South Yorkshire (GB)

(73) Assignee: ITM POWER (RESEARCH) LIMITED, Sheffield, South Yorkshire (GB)

( * ) Notice: Subject to any disclaimer, the term of this patent is extended or adjusted under 35 U.S.C. 154(b) by 325 days.

(21) Appl. No.: 13/505,166

(22) PCT Filed: Oct. 29, 2010

(86) PCT No.: PCT/GB2010/051812
§ 371 (c)(1),
(2), (4) Date: Jul. 16, 2012

(87) PCT Pub. No.: WO2011/051720
PCT Pub. Date: May 5, 2011

(65) Prior Publication Data
US 2012/0279854 A1    Nov. 8, 2012

(30) Foreign Application Priority Data

Nov. 2, 2009 (GB) .................................. 0919208.9
Jun. 17, 2010 (GB) .................................. 1010210.1

(51) Int. Cl.
*B05D 7/24* (2006.01)
*B01D 67/00* (2006.01)
*H01M 4/88* (2006.01)
*H01M 8/10* (2016.01)

(52) U.S. Cl.
CPC ........ *B01D 67/0006* (2013.01); *B01D 67/0088* (2013.01); *B01D 67/0093* (2013.01); *H01M 4/886* (2013.01); *H01M 4/8828* (2013.01); *H01M 8/1023* (2013.01); *H01M 8/1072* (2013.01); *B01D 2323/30* (2013.01); *B01D 2323/345* (2013.01); *B01D 2323/46* (2013.01); *B01D 2325/10* (2013.01); *B01D 2325/26* (2013.01); *B01D 2325/36* (2013.01); *Y02E 60/521* (2013.01); *Y02P 70/56* (2015.11)

(58) Field of Classification Search
None
See application file for complete search history.

(56) References Cited

U.S. PATENT DOCUMENTS

| 2003/0113603 | A1* | 6/2003 | Highgate ......................... 429/30 |
| 2004/0115498 | A1* | 6/2004 | McDonald et al. ............. 429/30 |
| 2004/0241518 | A1* | 12/2004 | Yang ................................ 429/33 |
| 2004/0241519 | A1* | 12/2004 | Howard .......................... 429/33 |
| 2005/0003255 | A1 | 1/2005 | Shimizu et al. |
| 2005/0031925 | A1* | 2/2005 | Ofer et al. ....................... 429/30 |
| 2005/0042489 | A1 | 2/2005 | Fukuta et al. |
| 2005/0163920 | A1* | 7/2005 | Yan et al. ....................... 427/115 |
| 2006/0057281 | A1* | 3/2006 | Izumi et al. .................... 427/115 |
| 2008/0063920 | A1* | 3/2008 | Highgate et al. ................ 429/40 |
| 2009/0068541 | A1* | 3/2009 | Yan et al. ........................ 429/40 |
| 2010/0159349 | A1* | 6/2010 | Highgate et al. .............. 429/483 |

FOREIGN PATENT DOCUMENTS

| JP | 2005-32535 | 2/2005 |
| JP | 2007-128764 | 5/2007 |
| JP | 2007-524973 | 8/2007 |
| WO | WO 03/023890 | 3/2003 |
| WO | WO 2004/042845 A2 | 5/2004 |
| WO | WO 2005/124893 A2 | 12/2005 |
| WO | WO 2007/000593 A2 | 1/2007 |
| WO | WO 2007/083229 A2 | 7/2007 |
| WO | WO 2008/122777 A1 | 10/2008 |

* cited by examiner

*Primary Examiner* — Erma Cameron
(74) *Attorney, Agent, or Firm* — Saliwanchik, Lloyd & Eisenschenk

(57) ABSTRACT

In a first aspect, a method for forming a ionic polymer membrane, comprises: (i) polymerising a mixture of one or more first monomers to form an ionic polymer membrane; (ii) soaking the polymer membrane of (i) into a mixture of one or more second monomers, for a sufficient length of time to allow the solution to penetrate through the entire polymer membrane; and (iii) polymerising the monomer-coated polymer of step (ii) to form an essentially homogenous ionic polymer. In a second aspect, a method for forming a catalyst-coated ionic polymer membrane, comprises: (i) polymerising a mixture of one or more first monomers to form an ionic polymer membrane; (ii) dipping the polymer of (i) into a mixture of one or more second monomers; (iia) depositing a catalyst onto the monomer-coated polymer; (iii) polymerising the monomer-coated polymer of step (iia). The present invention also includes membranes formed using these methods.

11 Claims, No Drawings

IONIC MEMBRANE PREPARATION

CROSS REFERENCE TO A RELATED APPLICATION

This application is a National Stage Application of International Application Number PCT/GB2010/051812, filed Oct. 29, 2010; which claims priority to Great Britain Application. Nos. 0919208.9, filed Nov. 2, 2009 and 1010210.1, filed Jun. 17, 2010; all of which are incorporated herein by reference in their entirety.

FIELD OF THE INVENTION

The present invention relates to methods for forming ionomer membranes.

BACKGROUND OF THE INVENTION

Membrane-electrode assemblies (MEAS) are used in a variety of electro-chemical cells. Hydrophilic polymer membranes are particularly useful as they have excellent electrical properties and good hydration control. Hydrophilic polymer membranes are described in WO03/023890, That publication describes the formation of a membrane from the in situ polymerisation of a homogeneous mixture or a hydrophilic monomer, a hydrophobic monomer, water and a monomer including a strongly ionic group. A cross-linker may also be added to the polymerisation mixture.

Interpenetrated network joints are described in WO2008/122777 and in WO2007/000593, These are regions where two different polymers are joined together. Interpenetrated networks are typically very small regions compared to the entire membrane. They are formed by allowing a monomer to penetrate only a short distance into a polymer membrane, and then polymerising, resulting in three distinct zones of: a first material; a second material; and a region of IPN containing both materials.

For an MEA to operate, contact between the membrane and catalyst is required, this can be achieved by coating the membrane with catalyst. Many methods of applying the catalyst are available, but all have the objective of achieving good contact between the membrane and the catalyst, as this improves cell efficiency. Many of the methods commonly employed have widely documented problems with catalyst contact and adhesion during subsequent membrane hydration and use.

SUMMARY OF THE INVENTION

It has been found that when an already cured polymer membrane is soaked in a monomer solution and then further cured, polymer density is increased. This has many benefits including increased polymer ultimate tensile strength and elongation to failure. These advantages are increased further when the already cured polymer membrane is hydrophilic.

In a first aspect, a method for forming an ionic polymer membrane, comprises:
(i) polymerising a mixture of one or more first monomers to form an ionic polymer membrane;
(ii) soaking the polymer membrane of (i) into a mixture of one or more second monomers, for a sufficient length of time to allow the solution to penetrate through the entire polymer membrane; and
(iii) polymerising the monomer-coated polymer of step (ii) to form an essentially homogenous ionic polymer.

It has also been found that by soaking or dipping the polymer membrane into a monomer solution and then removing it, a surface coated in liquid monomer can be created to which a catalyst (or catalyst ink) can be applied. If the catalyst coating is then cured into the ionomer membrane, this results in individual particles of catalyst being partially embedded in the monomer layer resulting in good three-phase contact between the membrane and catalyst. Furthermore, the monomers on the surface, once cured, will form an inter-penetrating network (IPN) with the membrane, resulting in good mechanical adhesion of the coating to the membrane.

In a second aspect, a method for forming a catalyst-coated ionic polymer membrane, comprises:
(i) polymerising a mixture of one or more first monomers to form an ionic polymer membrane;
(ii) dipping the polymer of (i) into a mixture of one or more second monomers;
(iia) depositing a catalyst onto the monomer-coated polymer;
(iii) polymerising the catalyst and monomer-coated polymer of step (iia).

DESCRIPTION OF THE PREFERRED EMBODIMENTS

The ionic polymer membrane may be any polymer including an ionic group. Preferably, the membrane is capable of swelling in the one or more second monomers. More preferably, the membrane is a hydrophilic polymer membrane (which is particularly good at absorbing other monomers).

In a preferred embodiment, the hydrophilic membrane is obtainable by the copolymerisation of a homogeneous mixture of a hydrophilic monomer, a hydrophobic monomer, water and a strongly ionic group. Preferably, the membrane is cross-linked, i.e. the monomer components to be polymerised include a cross-linker. In a preferred embodiment, the ionomer membrane is made according to the method disclosed in WO03/023890.

Preferred monomers (which includes the one or more first monomers used to form the membrane or the one or more second monomers that are added at step (ii)) are:
Hydrophobic Monomers:
   methyl methacrylate—(MMA)
   acrylonitrile—(AN)
   methacryloxypropyltris(trimethylsiloxy)silane—(TRIS)
   2,2,2-trifluoroethyl methacrylate—(TRIF)
Hydrophilic Monomers:
   methacrylic acid—(MA)
   2-hydroxyethyl methacrylate—(HEMA)
   ethyl acrylate—(EA)
   1-vinyl-2-pyrrolidinone—(VP)
   propenoic acid 2-methyl ester—(PAM)
   monomethacryloyloxyethyl phthalate—(EMP)
   ammonium sulphatoethyl methacrylate—(SEM)
Monomers containing a strongly ionic group:
   2-acrylamido-2-methyl-1-propanesulphonic acid (AMPSA)
   vinylsulphonic acid (VSA)
   styrenesulphonic acid (SSA)
   2-sulphoethyl methacrylate (SOMA)
   3-sulphopropyl methacrylate (Na salt) (SPM)
   Vinylbenzyl trimethyammonium chloride
   Vinylbenzyl trimethy phosponium chloride
   2,4,6-Tris(dimethylaminomethyl)pheno Preferably, the mixture of one or more first and/or one or more second monomers comprises a cross-linker, thereby forming a cross-linker polymer.

The ionomer membrane may be hydrated in water in between steps (i) and (ii). It may also be hydrated after step (iii)—this is referred to herein as step (iv).

Preferably, the solution of one or more second monomers comprises an ionic component. Preferably, the ionic component is a polymerisable monomer comprising a strongly ionic group. For example, this could be 2-acrylamido-2-methyl-propanesulfonic acid, or another ionic monomer selected from the list above. Alternative ionic groups are given below:
toluene sulphonic acid—(TSA)
1-methyl-1-benzimidazole-2-sulphonic acid
isethionic acid (Na salt)
1-hexanesulphonic acid (Na salt)
hydroxylene-O-sulphonic acid.

A polymer membrane obtainable by the method described herein has many beneficial properties including increased polymer density. This is due to the formation of a second crosslinked polymer interpenetrated, and in places, bonded with the existing crosslinked polymer.

The second monomer mixture may be the same as or different to the original formulation used to make the ionomer membrane (i.e. the first monomer mixture). The membrane is placed in the second monomer mixture for a period of time sufficient to allow the second monomer mixture to penetrate through the entire membrane. Preferably, this is for at least 3 hours, more preferably 6 hours. More preferably still, for at least 12 hours. Even more preferably, for at least 16 hours.

In a preferred embodiment, the polymer membrane (which the second monomer(s) are soaked into) is hydrophilic. This has the advantage that the hydrophilic polymer can absorb an increased amount of monomer mixture, resulting in a dense final polymer, which has increased strength. If the soaking solution contains an ionic monomer/ionic component, an ionic site density is achieved that would normally be prevented through solubility limits.

Preferably, the polymerising of step (iii) occurs throughout the membrane. In that embodiment, a method of polymerisation should be chosen to ensure that polymerisation occurs throughout the entire membrane.

Preferably, the first monomer mixture is homogeneous. Therefore, another advantage of a method of the invention is that a second monomer, which would not be homogeneous with the first monomer, may be polymerised into the final ionic polymer membrane, which would not otherwise be possible. Therefore, in one embodiment of the invention, at least one of the (or the) first monomers is not miscible with at least one of the (or the) second monomers, i.e. the mixture of one or more first monomers is not miscible/homogeneous with the mixture of one of more second monomers.

For the catalyst deposition method, i.e. the second aspect of the invention, it is not essential for the monomer to penetrate through the entire polymer such that a homogenous polymer is formed after airing. However, this is a preferred embodiment.

Preferably, the catalyst is in the form of a powder. More preferably, the catalyst is in the form of an ink composition comprising a suspension of a fine powder of catalyst in a solvent and binder.

Once the membrane has been soaked in the monomer and then removed, the excess monomer is preferably removed from the membrane, leaving a monomer layer less than about 1 mm thick on the surface. Catalyst can then be applied to the surface, i.e. in between steps (ii) and (iii). The catalyst may be a catalyst ink composition or a powdered catalyst. A catalyst ink composition may contain, for example, platinum, iridium oxide or nickel. Preferably, the catalyst is in the form of a fine powder dispersed in an organic solvent, such as xylene.

More preferably, the same or a different catalyst is deposited onto the polymer that is formed after step (iii) or step (iv).

The catalyst may be deposited by spraying onto the monomer-coated polymer. It may also be deposited by dipping the monomer-coated polymer into the catalyst.

A catalyst composition for use in the invention may additionally contain ionic component, electrically-conductive particles and/or an electrically conductive polymer to increase conduction across the surface of the membrane. Examples of ionic components are given above. Preferably, an ink composition for use in the invention comprises a catalyst, a binder and an organic solvent.

The catalyst may be deposited onto the monomer-coated membrane by any suitable method. Such methods are known to those skilled in the art, Examples of depositing methods are by spraying (e.g. of an ink) onto the membrane or by dipping the membrane into a catalyst (e.g. a catalyst powder).

The monomer soaked (which is optionally catalyst coated) membrane may be cured by thermal, UV or gamma radiation. Preferably, UV radiation is used.

The membrane may be hydrated in water prior to soaking in the monomer solution and/or after monomer-coated (and optionally also catalyst-coated) membrane has been cured (i.e. before step (ii) or after step (iv). Preferably the hydration is with water. More preferably, with Type 1 water.

For membranes with a high expansion in water, it is possible that the ink surface will crack during hydration, resulting in poor lateral conductivity across the surface and degraded performance. If this occurs, a second coating with catalyst can be carried out to improve the conduction. As this layer has a minimal catalytic benefit, a different ink formulation may be used, where most catalyst may be replaced with conducting components.

The invention will now be illustrated by the following Examples.

EXAMPLE 1

A membrane produced by a multi-stage curing production process where the $1^{st}$ SPE is soaked in a second liquid which is cured to produce a SPE with increased polymer density.

A membrane was produced by pouring 30 ml of an ionic mixture into a 14 cm×20 cm bag made from polythene (750 gauge) then excluding any air and sealing the liquid in using a heat seal. This was fixed in aluminium plates and treated with gamma irradiation to a total dose of 30 kGy. An 8 cm×8 cm sample was taken from this membrane and placed in a 14 cm×20 cm bag made from polythene (750 gauge). 30 ml of a second mixture was added to this bag and left in contact with the membrane for 24 hours. The excess liquid was removed and the bag was sealed to exclude air. The bag was fixed between aluminium plates and treated with gamma irradiation to a total dose of 30 kGy. The membrane was removed from the bag and hydrated in water. The resultant membrane has increased polymer density.

EXAMPLE 2

A membrane is formed from the following materials:

| | |
|---|---|
| Water | 66.96 g |
| 2-acrylamido-2-methyl-1-propane sulphonic acid (AMPSA) | 94.91 g |
| 2-hydroxyethyl methacrylate (HEMA) | 163.22 g |
| acrylonitrile (AN) | 139.37 g |
| divinylbenzene (DVB) | 19.76 g |

| | |
|---|---|
| UV initiator (UV1) | 3.38 g |
| hydroxyquinone monomethyl ether (MEHQ) | 0.098 g |

To make the soak mixture, the components were combined in an amber bottle in the following order: water, AMPSA, HEMA, AN, DVB, UV1, MEHQ, to produce a polymer membrane. In this case both membrane and soak mixture were made from the same monomer mixture.

200 ml of the polymer described above was added to 200 ppm MEHQ mixture in a Pyrex dish. The membrane was cut to size and carefully added to the dish, ensuring it was in the centre of the dish and completely surrounded by soak mixture. A lid was fitted to the dish and then it was put in a plastic bag in a 30° C. oven overnight to allow the membrane to soak. When it was ready to be cured, the membrane was lifted out of the soaking mixture using a pair of flat tweezers and placed on a sheet of LDPE plastic tubing. (At this stage the membrane may be sprayed with ink if required). The tubing was folded over the membrane to make a bag and a roller was used to flatten the membrane between the sheets of plastic, ensuring excess mixture and air was removed from the surface of the membrane. The membrane was then clamped in the curing jig and cured under a UV lamp (27-33 mW/cm$^2$ measured through the glass) for 900 s. It was then taken out of the curing jig, turned over so the opposite face of the membrane was facing upwards and put back under the lamp for a further 900 s.

The membrane may be hydrated as required or stored in the fridge in a sealed plastic bag.

EXAMPLE 3

Membrane Preparation

A 120 mm×120 mm cationic exchange membrane was hydrated in Type 1 water at 60° C. overnight. Once hydrated, the membrane was placed by 10" lay flat tubing and 60 ml of monomer liquid was added to the bag (of the same composition as was used to make the original membrane). It was then sealed and heated at 35° C. oven for 16 hours, allowing the monomer mixture to infuse into the membrane.

Ink Preparation

A Pt catalyst ink was prepared and ultrasonicated for 30 minutes and stirred overnight. The ink was always left stirring to prevent the ink becoming inhomogeneous.

Ink Spraying Method:

An airbrush was used for spraying. After the membrane was sprayed, it was cured in a jig under an Intellaray UV lamp (30 W/cm$^2$) for 20 minutes each side.

Once cured the membrane was hydrated in Type 1 water at 60° C., which caused the ink to crack with the expansion of the membrane. The membrane was then removed from the water, patted dry, sprayed for a second time and the solvent was left to evaporate.

The invention claimed is:

1. A method for forming an ionic polymer membrane, comprising:
   step (i) polymerising a mixture of first monomers to form an ionic polymer membrane;
   step (ii) soaking the polymer membrane formed in step (i) in a mixture of second monomers, for a sufficient length of time to allow the mixture of second monomers to penetrate through the entire polymer membrane and form a monomer-penetrated polymer, wherein at least one of the mixture of first monomers and the mixture of second monomers comprises an ionic component; and
   step (iii) polymerising the monomers of the monomer-penetrated polymer of step (ii) to form an essentially homogenous ionic polymer,
   wherein a catalyst is deposited onto the monomer-coated polymer in between steps (ii) and (iii).

2. The method according to claim 1, wherein the catalyst is in the form of a powder.

3. The method according to claim 2, wherein the catalyst is in the form of an ink composition comprising a suspension of a powder of catalyst and a binder, in a solvent.

4. The method according to claim 1, wherein the catalyst is deposited by spraying.

5. The method according to claim 1, wherein the catalyst is deposited by dipping the monomer-coated polymer into the catalyst.

6. A method for forming an ionic polymer membrane, comprising:
   step (i) polymerising a mixture of first monomers to form an ionic polymer membrane;
   step (ii) soaking the polymer membrane formed in step (i) in a mixture of second monomers, for a sufficient length of time to allow the mixture of second monomers to penetrate through the entire polymer membrane and form a monomer-penetrated polymer, wherein at least one of the mixture of first monomers and the mixture of second monomers comprises an ionic component;
   step (iii) polymerising the monomers of the monomer-penetrated polymer of step (ii) to form an essentially homogenous ionic polymer; and
   step (iv) hydrating the polymer that is formed after step (iii),
   wherein a catalyst is deposited onto the monomer-penetrated polymer in between steps (ii) and (iii), and wherein the same or a different catalyst is deposited onto the polymer that is formed after step (iii) or step (iv).

7. A method for forming a catalyst-coated ionic polymer membrane, comprising:
   step (i) polymerising a mixture of first monomers to form an ionic polymer membrane;
   step (ii) dipping the polymer membrane formed in step (i) into a mixture of second monomers to form a monomer-penetrated polymer;
   step (iia) depositing a powdered catalyst onto the monomer-penetrated polymer; and
   step (iii) polymerising the monomers of the monomer-penetrated polymer of step (iia).

8. The method according to claim 7, wherein the polymer membrane formed by step (i) is hydrophilic.

9. A polymer membrane obtained by the method according to claim 7.

10. A membrane electrode assembly comprising the polymer membrane according to claim 9.

11. The method according to claim 7, wherein the polymer membrane is hydrated in water in between steps (i) and (ii).

\* \* \* \* \*